June 24, 1952 R. B. CARTER, JR 2,601,430
DISTRIBUTOR OF THE ROTARY TYPE
Filed May 10, 1949
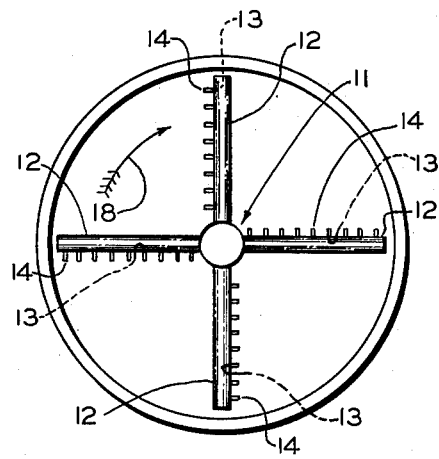
FIG. I.
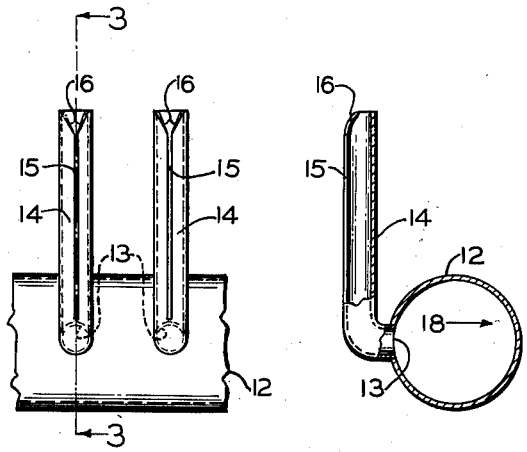
FIG. 2.
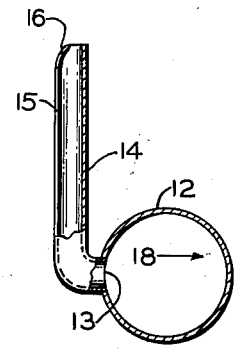
FIG. 3.
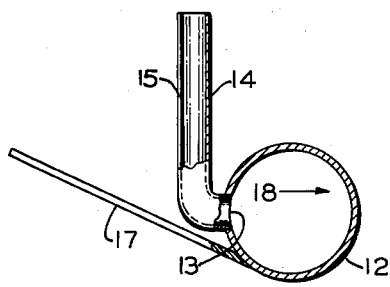
FIG. 4.
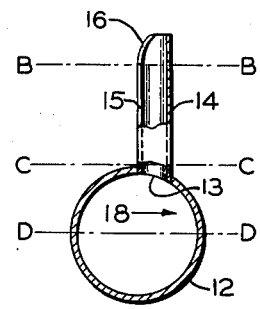
FIG. 5.
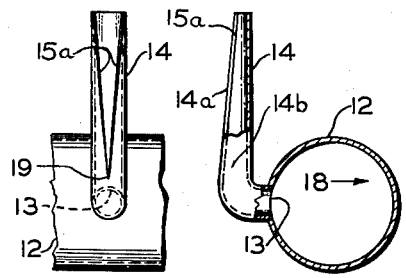
FIG. 6. FIG. 7.
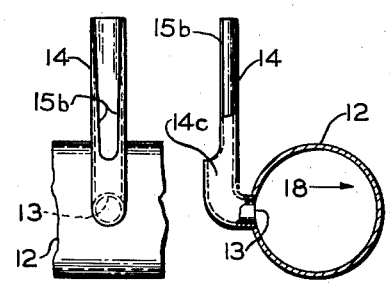
FIG. 8.
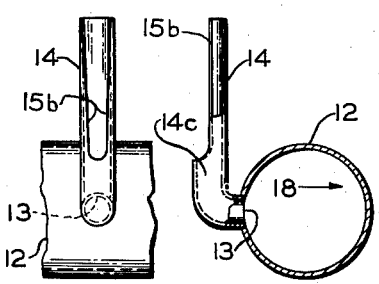
FIG. 9.
*INVENTOR.*
RALPH B. CARTER, JR.
BY
*his Attorney*

Patented June 24, 1952

2,601,430

UNITED STATES PATENT OFFICE 2,601,430

DISTRIBUTOR OF THE ROTARY TYPE

Ralph B. Carter, Jr., Maywood, N. J., assignor to Ralph B. Carter Company, Hackensack, N. J., a corporation of New York Application May 10, 1949, Serial No. 92,375

6 Claims. (Cl. 299—69)

This invention relates to distributors of the rotary type for more evenly distributing widely varying rates of liquid flow onto filter beds and the like.

More particularly it relates to a rotary reaction driven type of distributor having radial distributing arms of the hydraulically operated type incorporating therein discharge orifices.

One object of the invention is to provide a liquid distributor which will require a relative minimum of hydraulic head for its operation.

Another object of the invention is to provide a liquid distributor which will accommodate wide variations of influent rates with minimum differences in hydraulic head.

The present invention is particularly advantageous in its application to high rate filters where a continuous and widely varying flow of influent is pumped to the filter distributor.

A feature of the improvement is the ability to use standard pipe size arms instead of costly special arm shapes with longitudinal arm partitions, as well as delicately adjusted weir plates, such as are now being used. Another feature is the ability to control accurately the head for any given capacity and more important to control and keep to an absolute minimum differences in head between maximum and minimum capacity inflows.

The invention is located in a liquid distributor of the rotary type having a traveling liquid conducting distributing arm, and consists in the combination of an upright pipe in communication with the interior of said arm, having a vertical weir shaped orifice slot laterally of the pipe to discharge a certain predetermined quantity of liquid at a certain head, and having an enlarged orifice above the slot to greatly increase the quantities of the discharge at greater heads.

The invention will be more fully described hereinafter, embodiments thereof shown in the drawings, and the invention will be finally pointed out in the claims.

In the accompanying drawings,

Fig. 1 is a plan view of a distributor, as known with the improvement applied thereto;

Fig. 2 is a view of a section of a distributor arm, showing the improvement in elevation;

Fig. 3 is a vertical section taken on line 3—3 of Fig. 2;

Fig. 4 is a section similar to Fig. 3, showing a distributing plate as known, used with the improvement to spread the effluent discharging through the weir shaped orifice;

Fig. 5 is a similar section, but showing the orifice pipe on the top of the arm;

Fig. 6 shows a modified form of orifice, the upright pipe being shown in rear view;

Fig. 7 is a side view, partly in section of Fig. 6;

Fig. 8 shows still another form of orifice, the upright pipe being shown in rear view, and Fig. 9 is a side view, partly in section of Fig. 8.

Similar characters of reference indicate corresponding parts throughout the various views.

Referring to the drawings, the known mechanism consists of the conventional type of rotary distributor 11 which may be either of the reaction type or motor driven, with arms 12 having longitudinally spaced openings 13, from which heretofore, in some cases, the liquid was discharged.

To this known structure, the present invention is applied. This consists, in one embodiment, of an elbow pipe 14 having its lower end in commuication with the interior of the arm 12 through an opening 13 and its upper end closed or open. Along one side of the pipe 14, at its rear portion, (considered in the direction of its movement with the arm to which it is applied) a slot 15 is provided, which extends upwardly a predetermined distance, and then has its walls diverge to a generally V-shaped enlargement 16.

The slot 15 is designed to discharge therethrough between the levels B—B and C—C, Fig. 5, a predetermined and desired quantity of liquid at the desired or required minimum head, namely the head between the center line of the distributor arm D—D and the determinable level B—B. The opening above the level B—B, namely 16, rapidly increases the discharge area of the orifice allowing greater increased outflow than through the slot 15 without materially increasing the liquid level above the level B—B.

Although conventional spreader plates 17, Fig. 4, may be attached at an angle to a known discharge opening in the manner as known, to assist in distributing the outflow over the area between the longitudinally spaced openings of an arm 12, it is a known fact that these spreader plates such as 17, tend to counteract the reactionary force from the orifice which again must be compensated for by increased head requirements. My invention contemplates the possibility of mounting the discharge orifices in the top of the distributing arm, as shown in Fig. 5, and using the tubular surface of the arm 12 itself as a spreader securing an unusually broad distribution. In Fig. 5, the discharge orifice pipe 14 is disposed somewhat to the front of the central portion (toward the leading edge of the arm), providing a large surface for spreading and aeration.

In Fig. 6 is shown a discharge opening 15a of general V-shape, the lower portion 19 or apex of the V, corresponding to the bottom of the rectangular slot 15 of Figs. 2, 3, 4 and 5. The pipe 14 is generally like that shown in Figs. 2, 3, 4 and 5, but preferably, in this embodiment, provided with inclined wall 14a, as shown.

Similarly, in Fig. 8, an apical curved orifice 15b is shown, the lower part of which corresponds to the bottom of the slot in Figs. 2, 3, 4 and 5. In Fig. 7, the lower part 14b of the upright pipe 14 is widened; and in Fig. 9, a widened part 14c is also shown.

The arrow 18 indicates the direction of movement of the arms 12.

Filter arm orifices as heretofore used are designed to give a certain reaction (and therefore not only a rotary motion to the distributor mechanism, but a rotary motion at a certain speed), at a certain capacity and head. If these capacities pumped to the filter distributor are increased (the difference between maximum and minimum is often more than 100%), many undesirable results are obtained. To mention a few, (1) the head required to discharge the additional influent through fixed orifices is considerable; (2), the filter with its much greater reactionary force rotates at a much greater speed changing undesirably the application ratios; and (3), additional serious problems of distributor liquid sealing mechanisms are created. The first, however, is probably the most serious for, since, as the head increases, an increase of even one foot expressesd in terms of pumping power costs over an extended period, is serious. These undesirable conditions are fully recognized in the art and other methods have been proposed to accomplish the desired results. Most of these other methods include additional filter arms (either separate, or separate longitudinal sections inside one arm) with additional discharge orifices. These additional arms and orifices only come into play when additional capacities create sufficient additional head to cause the excess liquid to flow over a weir placed in the distributor center column and thence into the additional arms. The present invention in its simple construction overcomes these disadvantages.

I wish it to be understood that I do not desire to be limited to the exact details of construction shown and described, for obvious modifications will occur to a person skilled in the art.

I claim:

1. In a liquid distributor of the rotary type having a traveling liquid conducting distributing arm with a plurality of longitudinally spaced openings therein, the combination of a plurality of like upright pipes in communication with the interior of said arm through respective longitudinally spaced openings, and including in each upright pipe a weir shaped orifice to discharge a certain predetermined quantity of liquid up to a certain head under which the said distributor operates, and having an enlargement above said orifice to greatly increase the quantities of the discharge at greater heads all of said orifices being adapted to discharge in equal volume at the same time and at the same horizontal levels.

2. In a liquid distributor of the rotary type having a traveling liquid conducting distributing arm, the combination of a plurality of like vertically disposed pipes having its lower end in liquid communication with the interior of said arm, and each having an orifice of a length and of sufficient width to deliver the designed flow of the distributor at the designated operating head under which said distributor operates, said orifice having a wider outlet above said length for the discharge at heads greater than the aforesaid head all of said orifices being adapted to discharge in equal volume at the same time and at the same horizontal levels.

3. In a liquid distributor of the rotary type having a traveling liquid conducting distributing arm, the combination of a plurality of like vertically disposed pipes having its lower end in liquid communication with the interior of said arm, and each having a vertical orifice of a length and of sufficient width to deliver the designed flow of the distributor at the designated operating head under which said distributor operates, said orifice having a wider outlet above said length for the discharge at heads greater than the aforesaid head, said pipe being disposed vertically of the arm and having a horizontal portion at its lower end supported by said arm, all of said orifices being adapted to discharge in equal volume at the same time and at the same horizontal levels.

4. In a liquid distributor of the rotary type having a traveling liquid conducting distributing arm, the combination of a plurality of like vertically disposed pipes having its lower end in liquid communication with the interior of said arm, and each having a vertical orifice of a length and of sufficient width to deliver the designed flow of the distributor at the designated operating head under which said distributor operates, said orifice having an enlarged outlet above said length for the discharge at heads greater than the aforesaid head, said orifice being an elongated slot and said enlarged outlet being V-shaped with its apex merging into the slot all of said orifices being adapted to discharge in equal volume at the same time and at the same horizontal levels.

5. In a liquid distributor of the rotary type having a traveling liquid conducting distributing arm, the combination of a plurality of like vertically disposed pipes having its lower end in liquid communication with the interior of said arm, and each having a vertical orifice of a length and of sufficient width to deliver the designed flow of the distributor at the designated operating head under which said distributor operates, said orifice having a wider outlet above said length for the discharge at heads greater than the aforesaid head, said orifice being wider at its top than at its bottom, and said enlargement being wider than the widest part of the orifice all of said orifices being adapted to discharge in equal volume at the same time and at the same horizontal levels.

6. In a liquid distributor of the rotary type having a traveling liquid conducting distributing arm with a plurality of spaced openings, the combination of a plurality of vertically disposed pipes, each having its lower end in liquid communication with the interior of said arm, and each having a vertical lateral orifice for discharge rearwardly of the arm, and having a length terminating at a point in the pipe corresponding to a certain head under which said distributor operates, and a superposed wider portion for the discharge at heads greater than the aforesaid head all of said orifices being adapted to discharge in equal volume at the same time and at the same horizontal levels.

RALPH B. CARTER, Jr.

REFERENCES CITED

The following references are of record in the file of this patent:

UNITED STATES PATENTS

| Number | Name | Date |
|---|---|---|
| 871,029 | Buelna et al. | Nov. 12, 1907 |
| 964,945 | Vacher | July 19, 1910 |
| 1,752,316 | Voshardt | Apr. 1, 1930 |
| 1,780,332 | Brickhill | Nov. 4, 1930 |
| 2,047,378 | Martin | July 14, 1936 |
| 2,064,072 | McArdle | Dec. 15, 1936 |
| 2,181,932 | Beddoes | Dec. 5, 1939 |
| 2,314,423 | Page | Mar. 23, 1943 |

FOREIGN PATENTS

| Number | Country | Date |
|---|---|---|
| 503,891 | Germany | July 31, 1930 |
| 351,665 | Great Britain | July 2, 1931 |